US008638865B2

(12) United States Patent  (10) Patent No.: US 8,638,865 B2
Jiang et al.  (45) Date of Patent: Jan. 28, 2014

(54) APERIODIC CHANNEL QUALITY INFORMATION SENDING METHOD

(75) Inventors: Jing Jiang, Guangdong Province (CN); Chenchen Zhang, Guangdong Province (CN); Junfeng Zhang, Guangdong Province (CN)

(73) Assignee: ZTE Corporation, Shenzhen, Guangdong (CN)

( * ) Notice: Subject to any disclaimer, the term of this patent is extended or adjusted under 35 U.S.C. 154(b) by 25 days.

(21) Appl. No.: 13/259,322

(22) PCT Filed: Jan. 28, 2010

(86) PCT No.: PCT/CN2010/070404
§ 371 (c)(1),
(2), (4) Date: Jan. 10, 2012

(87) PCT Pub. No.: WO2010/121502
PCT Pub. Date: Oct. 28, 2010

(65) Prior Publication Data
US 2012/0106661 A1    May 3, 2012

(30) Foreign Application Priority Data
Apr. 22, 2009 (CN) .......................... 2009 1 0137309

(51) Int. Cl.
*H04L 27/00* (2006.01)
(52) U.S. Cl.
USPC ........................................................ 375/259
(58) Field of Classification Search
None
See application file for complete search history.

(56) References Cited

U.S. PATENT DOCUMENTS

| | | | |
|---|---|---|---|
| 2006/0079221 A1* | 4/2006 | Grant et al. | 455/423 |
| 2007/0115796 A1* | 5/2007 | Jeong et al. | 370/203 |
| 2008/0101498 A1* | 5/2008 | Han et al. | 375/267 |
| 2008/0144737 A1* | 6/2008 | Naguib | 375/299 |
| 2008/0268785 A1* | 10/2008 | McCoy et al. | 455/67.11 |
| 2009/0201861 A1* | 8/2009 | Kotecha | 370/329 |

(Continued)

FOREIGN PATENT DOCUMENTS

| | | |
|---|---|---|
| CN | 101155401 A | 4/2008 |
| CN | 101359953 A | 2/2009 |

OTHER PUBLICATIONS

Nortel, CQI/PMI Reporting on PUSCH/PUCCH; 3GPP TSG-RAN WG1#53bis, R1-082514; Warsaw, Poland, Jun. 30, 2008.
Qualcom Europe, Feedback options in support of dual-stream beamforming, 3GPP TSG-RAN WGI Meeting #56b, R1-091449 (2009).

(Continued)

*Primary Examiner* — David C. Payne
*Assistant Examiner* — Bahman Badipour
(74) *Attorney, Agent, or Firm* — Scully, Scott, Murphy & Presser, P.C.

(57) ABSTRACT

The present invention provides an aperiodic channel quality information sending method and a mobile terminal. The method comprises: a mobile terminal and network side pre-appointing one or more transmission modes which support the forming of dual flow beam, and aperiodic channel quality information CQI feedback mode(s) corresponding to the transmission modes; the network side indicating the mobile terminal with one pre-appointed transmission mode to be adopted, wherein when the mobile terminal receiving the indication of adopting the one pre-appointed transmission mode, the mobile terminal adopts the aperiodic CQI feedback mode corresponding to the one pre-appointed transmission mode to feed back the CQI information to the network side. The method of the present invention facilitates the reduction of signaling overhead and feedback overhead, the increase of the feedback dimensionality of the channel information, and the improvement of the throughput of the system.

10 Claims, 1 Drawing Sheet

(56) References Cited

U.S. PATENT DOCUMENTS

| | | | |
|---|---|---|---|
| 2009/0303951 A1* | 12/2009 | Lunttila et al. | 370/329 |
| 2009/0310693 A1* | 12/2009 | Baker et al. | 375/260 |
| 2010/0284359 A1* | 11/2010 | Kim et al. | 370/329 |
| 2011/0077040 A1* | 3/2011 | Nammi et al. | 455/507 |
| 2011/0268067 A1* | 11/2011 | Seo et al. | 370/329 |
| 2013/0044714 A1* | 2/2013 | Kotecha et al. | 370/329 |

OTHER PUBLICATIONS

LG Electronics, Correction relative to maximum RB size, 3GPP TSG-RAN WG1 Meeting #56b, R1-091183 (2009).

3rd Generation Partnership Project: Technical Specification Group Radio Access Network; Evolved Universal Terrestrial Radio Access (E-UTRA); Physical layer procedures (Release 8), 3GPP TS 36, 213 V8. 6.0 (2009).

* cited by examiner

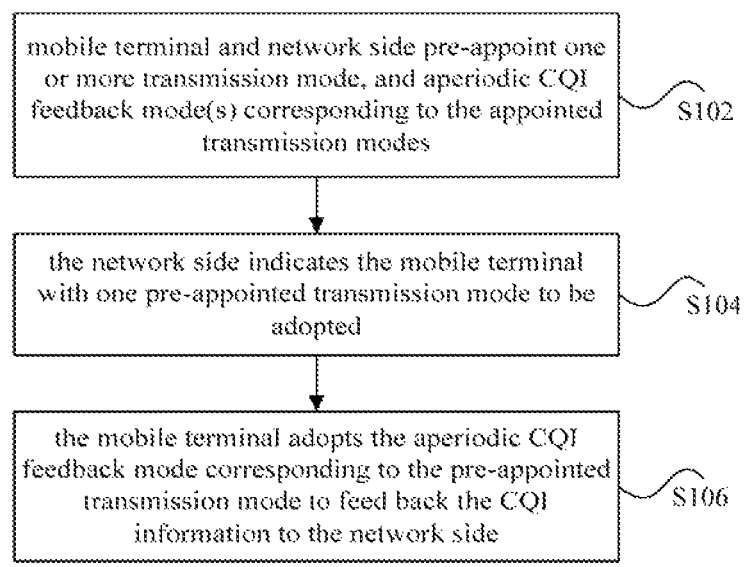

APERIODIC CHANNEL QUALITY INFORMATION SENDING METHOD

FIELD OF THE INVENTION

The present invention relates to the long term evolution (LTE) system and the advanced long term evolution system (LTE advanced), in particular to an aperiodic channel quality information sending method.

BACKGROUND OF THE INVENTION

At present, in the LTE system, seven kinds of transmission modes are defined, wherein each transmission mode adopts different multi-antenna processing methods, therefore different channel information needs to be fed hack. These seven transmission modes and the corresponding aperiodic channel quality information (CQI) feedback modes are as follows:

the transmission mode 1 (based on single antenna transmission mode of the antenna terminal port 0) adopts aperiodic CQI feedback mode 2-0 or 3-0;

the transmission mode 2 (transmit diversity) adopts aperiodic CQI feedback mode 2-0 or 3-0;

the transmission mode 3 (open loop multiplexing) adopts aperiodic CQI feedback mode 2-0 or 3-0;

the transmission mode 4 (closed loop multiplexing) adopts aperiodic CQI feedback modes 1-2, 2-2 or 3-1;

the transmission mode 5 (multiple-input and multiple-output (MIMO)) adopts aperiodic CQI feedback mode 3-1;

the transmission mode 6 (closed-loop multiplexing with rank of 1) adopts aperiodic CQI feedback modes 1-2, 2-2 or 3-1; and the transmission mode 7 (based on single antenna transmission mode of antenna terminal port 5) adopts aperiodic CQI feedback mode 2-0 or 3-0.

The feedback contents of each aperiodic CQI feedback mode in the above are as shown in Table 1.

TABLE 1

Feedback Contents of Each Aperiodic CQI Feedback Mode

| Feedback modes | Feedback Contents |
| --- | --- |
| Mode 1-2 | Full bandwidth (hereinafter referred to as wideband) feedback: optimum PMI (pre-coding information) of each subband, the Wideband CQI of each flow (the feedback PMI of each subband adopted), and only in the transmission mode 4, different feedback modes are adopted according to the different ranks |
| Mode 2-0 | User equipment (UE) selects subband feedback, UE selects M subbands, reports the CQI of the M subbands of the first flow, and reports the wideband CQI of the first flow. For the transmission mode 3, the CQI is calculated according to the reported RI, and for other modes, the rank equals to 1 |
| Mode 2-2 | UE selects subband feedback, and reports the CQI of M subbands (using one PMI), the PMI of the M subbands, wideband CQI and wideband PMI (only in the transmission mode 4, different modes are adopted according to the different ranks) |
| Mode 3-0 | high level configured wideband CQI (which is sent only on the subband set), and the CQI of each subband (which is sent only on the subband) aims at the first flow (only in the transmission mode 3, different feedback modes are adopted according to different ranks) |

TABLE 1-continued

Feedback Contents of Each Aperiodic CQI Feedback Mode

| Feedback modes | Feedback Contents |
| --- | --- |
| Mode 3-1 | High level configured subband feedback, wideband PMI, subband CQI of each flow (using wideband PMI). wideband CQI of each flow (using wideband PMI). For antenna mode 4, the corresponding PMI and CQI are calculated according to the RI, and for other modes, the rank equals to 1 |

While, the transmission mode corresponding to the forming of dual flow beam has not be designed in the standard, and the aperiodic CQI feedback mode which can be able to support the forming of dual flow beam also has not been determined. In the present invention, the corresponding transmission mode and the aperiodic CQI feedback mode will be designed as for the forming of dual flow beam.

SUMMARY OF THE PRESENT INVENTION

In order to solve the existing technical problem, the present invention provides an aperiodic channel quality information sending method, so as to provide the channel information needed for the forming of the multi-antenna technology by using dual flow beam.

In order to solve the above-mentioned problem, the present invention discloses an aperiodic channel quality information sending method, and the method comprises: a mobile terminal and network side pre-appointing one or more transmission modes which support the forming of dual flow beam, and aperiodic channel quality information CQI feedback mode(s) corresponding to the transmission modes; the network side indicating the mobile terminal with one pre-appointed transmission mode to be adopted; and when the mobile terminal receiving the indication of adopting the one pre-appointed transmission mode, the mobile terminal adopting the aperiodic CQI feedback mode corresponding to the one pre-appointed transmission mode to feed back the CQI information to the network side.

In the method, the mobile terminal also adopts the aperiodic CQI feedback mode to feed back the pre-coding information PMI to the network side.

In the above, adopting the aperiodic CQI feedback mode corresponding to the one pre-appointed transmission mode to feed back the PMI to the network side, when the mobile terminal determining that the network side can not obtain the multi-antenna weighted value information via the uplink channel.

In the method, the mobile terminal and the network side pre-appointing that a transmission mode 8 supports the forming of dual flow beam which does not need the pre-coding information feedback, wherein the aperiodic CQI feedback mode of the transmission mode 8 is the feedback mode 2-0 or the feedback mode 3-0;

the mobile terminal adopting the feedback mode 2-0 or the feedback mode 3-0 to feed back the CQI information of the first flow.

In the method, the mobile terminal and the network side pre-appointing that a transmission mode 8 supports the forming of dual flow beam which needs or does not need the pre-coding information feedback, wherein the aperiodic CQI feedback mode of the transmission mode 8 is the feedback mode 2-0, the feedback mode 3-0, the feedback mode 1-2, the feedback mode 2-2 or the feedback mode 3-1;

the mobile terminal adopting the feedback mode 2-0 or the feedback mode 3-0 to feed back the CQI information of the first flow; or the mobile terminal adopting the feedback mode 1-2, the feedback mode 2-2 or the feedback mode 3-1 to feed back the CQI information, the rank RI information and the PMI information of each flow.

In the method, the mobile terminal and the network side pre-appointing that a transmission mode 8 supports the forming of dual flow beam which does not need the pre-coding information feedback, and a transmission mode 9 supports the forming of dual flow beam which needs the pre-coding information feedback, wherein the aperiodic CQI feedback mode of the transmission mode 8 is the feedback mode 2-2 or the feedback mode 3-0, and the aperiodic CQI feedback mode of the transmission 9 is the feedback mode 1-2, the feedback mode 2-2 or the feedback mode 3-1;

the mobile terminal adopting the feedback mode 2-0 or the feedback mode 3-0 to feed back the CQI information of the first flow; or the mobile terminal adopting the feedback mode 1-2, the feedback mode 2-2 or the feedback mode 3-1 to feed back the CQI information, the rank RI information and the PMI of each flow.

In the method, the mobile terminal and the network side pre-appointing that a transmission mode 8 supports the forming of dual flow beam which needs the pre-coding information feedback, and a transmission mode 9 supports the forming of dual flow beam which does not need the pre-coding information feedback, wherein the aperiodic CQI feedback mode of the transmission mode 8 is the feedback mode 1-2, the feedback mode 2-2, or the feedback mode 3-1, and the aperiodic CQI feedback mode of the transmission 9 is the feedback mode 2-0, or the feedback mode 3-0;

the mobile terminal adopting the feedback mode 1-2, the feedback mode 2-2 or the feedback mode 3-1 to feed back the CQI information, the rank RI information and the PMI of each flow; or the mobile terminal adopting the feedback mode 2-0 or the feedback mode 3-0 to feed back the CQI information of the first flow.

In the method, the mobile terminal and the network side pre-appointing that a transmission mode 4 supports the forming of dual flow beam which needs the pre-coding information feedback and the closed loop multiplexing, and a transmission mode 8 supports the forming of dual flow beam which does not need the pre-coding information feedback, wherein the aperiodic CQI feedback mode of the transmission mode 4 is the feedback mode 1-2, the feedback mode 2-2 or the feedback mode 3-1, and the aperiodic CQI feedback mode of the transmission mode 8 is the feedback mode 2-0 or the feedback mode 3-0;

the mobile terminal adopting the feedback mode 1-2, the feedback mode 2-2 or the feedback mode 3-1 to feed back the CQI information, the rank RI information and the PMI of each flow; or the mobile terminal adopting the feedback mode 2-0 or the feedback mode 3-0 to feed back the CQI information of the first flow.

In the method, the mobile terminal and the network side pre-appointing that a transmission mode 3 supports the forming of dual flow beam which needs no PMI feedback and the open loop multiplexing, and a transmission mode 4 supports the forming of dual flow beam which needs the PMI feedback and the closed loop multiplexing, wherein the aperiodic CQI feedback mode of the transmission mode 3 is the feedback mode 2-0 or the feedback mode 3-0, and the aperiodic CQI feedback mode of the transmission mode 4 is the feedback mode 1-2, the feedback mode 2-2 or the feedback mode 3-1;

the mobile terminal adopting the feedback mode 2-0 or the feedback mode 3-0 to feed back the CQI information of the first flow; or the mobile terminal adopting the feedback mode 1-2, the feedback mode 2-2 or the feedback mode 3-1 to feed back the CQI information, the rank RI information and the PMI of each flow.

In the method, the mobile terminal and the network side pre-appointing that a transmission mode 3 supports the forming of dual flow beam which needs no PMI feedback and the open loop multiplexing, and a transmission mode 8 supports the forming of dual flow beam which needs the PMI feedback, wherein the aperiodic CQI feedback mode of the transmission mode 3 is the feedback mode 2-0 or the feedback mode 3-0, and the aperiodic CQI feedback mode of the transmission mode 8 is the feedback mode 1-2, the feedback mode 2-2 or the feedback mode 3-1;

the mobile terminal adopting the feedback mode 2-0 or the feedback mode 3-0 to feed back the CQI information of the first flow; or the mobile terminal adopting the feedback mode 1-2, the feedback mode 2-2 or the feedback mode 3-1 to feed back the CQI information, the rank RI information and the PMI of each flow.

The present invention also provides a mobile terminal which supports sending the aperiodic channel quality information, with the mobile terminal configured to:

pre-appoint, together with network side, one or more transmission modes which support the forming of dual flow beam, and aperiodic channel quality information CQI feedback mode corresponding to the transmission modes: and when receiving from the network side an indication of adopting one pre-appointed transmission mode, adopting the aperiodic CQI feedback mode corresponding to the one pre-appointed transmission mode to feed back the CQI information to the network side.

The mobile terminal of the present invention also is further configured to adopt the aperiodic CQI feedback mode corresponding to the one pre-appointed transmission mode to feed back the pre-coding information PMI to the network side.

The mobile terminal of the present invention also is configured to adopt the aperiodic CQI feedback mode corresponding to the one pre-appointed transmission mode to feed back the PMI to the network side, when determining the network side can not obtain the multi-antenna weighted value information via the uplink channel.

Compared with the prior art, the present invention has the following advantages:

(1) the present invention provides the CQI information of two flows so that the feedback requirements of the forming of dual flow beam can be met.

(2) the present invention proposes how the existing CQI feedback mode in the LTE is used in the forming of dual flow beam so that the new feedback format is not required to be added which is in favor of reducing signaling overhead.

(3) the feedback contents proposed by the present invention includes the rank feedback, wherein when the rank equals to 1, the single flow is adopted; and when the rank equals to 2, the dual flow is adopted, so that the handover from the forming of single flow beam to the forming of dual flow beam can be supported, even the handover of multi-flows.

(4) the present invention provides the CQI feedback mode without PMI feedback information so that the forming of multi-flow beam which does not feed back the PMI can be supported, therefore facilitating the reduction of the feedback overhead.

(5) the present invention also provides the CQI feedback mode with PMI feedback information so that the forming of multi-flow beam which feeds back the PMI can be supported, therefore facilitating the increase of the feedback dimensionality of the channel information, and improvement of the throughput of the system.

BRIEF DESCRIPTION OF THE ACCOMPANYING DRAWINGS

FIG. 1 is a flowchart of an aperiodic channel quality information sending method of the present invention.

PREFERABLE IMPLEMENTATION MODE OF THE PRESENT INVENTION

The main concept of the present invention is that a mobile terminal and network side (refers to a base station in the present invention) pre-appoint one or more modes which support the forming of dual flow beam, and configure an aperiodic CQI feedback mode(s) for the pre-appointed transmission mode; the aperiodic CQI feedback mode adopts standard defined aperiodic mode, and the feedback content is the same as the standard speculation which at least comprises CQI information. When the terminal determines that the network side can not obtain the multi-antenna weighted information by using the reciprocity of the channel (that is, the uplink and the downlink channel information are quite different, the weighted value processed by multi-antenna can not be obtained according to the uplink channel information), the aperiodic CQI feedback mode also needs to comprise PMI information, and the PMI information selects pre-coding matrices of different rows according to the different ranks.

In the above, the CQI information of each flow fed back in the aperiodic CQI feedback mode further comprises the CQI information of wideband and subband.

RI information is the available layer number which is needed in the feedback of the forming of dual flow beam.

The technical solution of the present invention will be detailed hereinafter in connection with the embodiments.

FIG. 1 is a flowchart of an aperiodic channel quality information sending method of the present invention, as shown in FIG. 1, the method comprises the following steps:

Step S102, mobile terminal and network side pre-appoint one or more transmission mode, and aperiodic CQI feedback mode(s) corresponding to the appointed transmission modes;

Step S104, the network side indicates the mobile terminal with one pre-appointed transmission mode to be adopted; and Step S106, the mobile terminal adopts the aperiodic CQI feedback mode corresponding to the pre-appointed transmission mode to feed back the CQI information to the network side.

The First Embodiment

An aperiodic CQI sending method supporting the forming of dual flow beam is applicable to LTE release 9.0 system and LTE advanced system. The concrete implementation is as follows.

A transmission mode 8 is pre-appointed to support the forming of dual flow beam which does not need the pre-coding information feedback, wherein the pre-appointed aperiodic CQI feedback mode corresponding to the transmission mode 8 are the feedback mode 2-0 or the feedback mode 3-0, and the two feedback modes comprise the CQI information of the first flow.

The prior CQI feedback modes 2-0 and 3-0 do not support the multi-flow feedback of the transmission mode 8 in the embodiment. As a result, in the present embodiment, the prior feedback modes 2-0 and 3-0 are added with feeding back the CQI information of the first flow according to the transmission mode 8. Concretely, the feedback contents of the aperiodic CQI feedback modes 2-0 and 3-0 are shown in Table 2.

TABLE 2

Feedback Contents of the Aperiodic
CQI Feedback Modes 2-0 and 3-0

| Feedback Mode | Feedback Contents |
|---|---|
| Mode 2-0 | UE selects subband feedback, UE selects M subbands, reports the CQI of the M subbands of the first flow, and reports the wideband CQI of the first flow. For the transmission mode 3 and the transmission 8, the CQI is calculated according to the reported RI, and for other modes, the rank equals to 1. |
| Mode 3-0 | High level configured wideband CQI (which is sent only on the subband set), and the CQI of each subband (which is sent only on the subband), corresponding to the first flow (only in the transmission mode 3 and the transmission mode 8, different feedback modes are adopted according to different ranks) |

After the above-mentioned pre-appointment is completed, the network side indicates the mobile terminal to access to the transmission mode to be adopted by the user (the transmission mode 8 in the embodiment) via a high level signaling; the mobile terminal adopts according to the received indication the aperiodic CQI feedback modes 2-0 and 3-0 corresponding to the transmission mode 8 to feed back the CQI information to the network side; and the network side, according to the information, configures the MCS (modulation coding scheme) or multi-antenna weighted information sent through the downlink, and send the service data.

The Second Embodiment

An aperiodic CQI sending method supporting the forming of dual flow beam is applicable to LTE release 9.0 system and LTE advanced system. The concrete implementation is as follows.

A transmission mode 8 is pre-appointed to support the forming of dual flow beam which needs/does not need the pre-coding information feedback, wherein the pre-appointed aperiodic CQI feedback mode corresponding to the transmission mode 8 are modes 2-0, 3-0, 1-2, 2-2 and 3-1, and the five feedback modes at least comprise the CQI information.

The CQI feedback modes 2-0 and 3-0 in the present embodiment are obtained by adding the transmission mode 8 into the existing aperiodic CQI feedback modes 2-0 and 3-0, i.e., the CQI information of the first flow is fed back according to different RI. Particularly, the feedback contents of the aperiodic CQI feedback modes 2-0 and 3-0 are shown in Table 3.

Similarly, the prior CQI feedback modes 1-2, 2-2 and 3-1 do not support the multi-flow feedback of the transmission mode 8 in the present embodiment. As a result, in the present embodiment, the CQI information of multiple flows are fed back according to the different RI values on the basis of the prior aperiodic CQI feedback modes 1-2, 2-2 and 3-1. Particularly, the feedback contents of the aperiodic CQI feedback modes 1-2, 2-2 and 3-1 in the present embodiment are shown in Table 3, which are the same as the feedback contents in Standard 3GPP TS 36.213 7.2.1.

TABLE 3

Feedback Contents of Aperiodic CQI
Feedback Modes 2-0, 3-0, 1-2, 2-2 and 3-1

| Feedback Mode | Feedback Contents |
|---|---|
| Mode 2-0 | UE selects subband feedback, UE selects M subbands, reports the CQI of the M subbands of the first flow, and reports the wideband CQI of the first flow. For the transmission mode 3 and the transmission mode 8, the CQI is calculated according to the reported RI, and for other modes, the rank equals to 1 |
| Mode 3-0 | High level configured wideband CQI (which is sent only on the subband set), and the CQI of each subband (which is sent only on the subband), all corresponding to the first flow (only the transmission mode 3 and the transmission mode 8, different modes are adopted according to different ranks) |
| Mode 1-2 | Full bandwidth (hereinafter referred to as wideband) feedback: optimum PMI (pre-coding information) of each subband, and the Wideband CQI of each flow (each subband adopts the feedback PMI), and only the transmission mode 4 and the transmission mode 8 are adopted according to the different ranks |
| Mode 2-2 | UE selects subband feedback, and reports the CQI of M subbands (using one PMI), the PMI of the M subbands, wideband CQI and wideband PMI (only in the transmission mode 4 and the transmission mode 8, different modes are adopted according to the different ranks) |
| Mode 3-1 | High level configured subband feedback, wideband PMI, subband CQI of each flow (using wideband PMI). and widehand CQI of each flow (using wideband PMI). For the transmission mode 4 and the transmission mode 8, the corresponding PMI and CQI are calculated according to the RI, and for other modes, the rank equals to 1. |

After the above-mentioned pre-appointment is completed, the network side indicates the mobile terminal to access to the transmission mode to be adopted by the user (the transmission mode 8 in the embodiment) via a high level signaling; after receiving the indication, the mobile terminal, according to the actual condition, adopts the aperiodic CQI feedback modes 2-0, 3-0, 1-2, 2-2 or 3-1 corresponding to the transmission mode 8 in the present embodiment to send the RI information and the CQI information to the network side. Particularly, when the mobile terminal determines that the network side can not obtain the multi-antenna weighted information depending on the reciprocity of the uplink channel, the mobile terminal adopts the aperiodic CQI feedback modes 1-2, 2-2 or 3-1, and therefore feeds back the PMI information to the network side on the basis of feeding back the RI information and the CQI information of the two flows to the network side. When the mobile terminal determines that the network side can obtain the multi-antenna weighted information depending on the reciprocity of the uplink channel, the mobile terminal adopts the aperiodic CQI feedback mode 2-0 or 3-0, and therefore feeds hack the CQI information of the first flow to the network side. The network side, according to the information, configures the MCS (modulation coding scheme) or multi-antenna weighted information sent through the downlink, and send the service data.

The Third Embodiment

An aperiodic CQI feedback method supporting the forming of dual flow beam is applicable to LTE release 9.0 system and LTE advanced system. The concrete implementation is as follows.

A transmission mode 8 and a transmission mode 9 are pre-appointed, wherein the transmission mode 8 supports the forming of dual flow beam which does not need the pre-coding information feedback; and the transmission mode 9 supports the forming of dual flow beam which needs the pre-coding information feedback, wherein the transmission mode 8 and the transmission mode 9 are only the terms defined by the present invention, whose the corresponding contents and the feedback modes can be exchanged with each other.

The aperiodic CQI feedback modes 2-0 and 3-0 corresponding to the transmission mode 8 in the present embodiment are appointed.

The aperiodic CQI feedback modes 1-2, 2-2 and 3-1 corresponding to the transmission mode 9 in the present embodiment are appointed.

In the above, the aperiodic CQI feedback modes 2-0, 3-0, 1-2, 2-2 and 3-1 at least comprise the RI information and the CQI information of the two flows.

The aperiodic CQI feedback modes 2-0 and 3-0 are obtained by feeding back the CQI information of the first flow on the basis of the existing aperiodic CQI feedback modes 2-0 and 3-0. Particularly, the feedback contents of the aperiodic CQI feedback modes 2-0 and 3-0 in the present embodiment are shown in Table 4.

The aperiodic CQI feedback modes 1-2, 2-2 and 3-1 are obtained by feeding back the CQI information of multiple flows according to the different RI values on the basis of the existing aperiodic CQI feedback modes 1-2, 2-2 and 3-1. Particularly, the feedback contents of the aperiodic CQI feedback modes 1-2, 2-2 and 3-1 in the present embodiment are shown in Table 4.

TABLE 4

Feedback Contents of Aperiodic CQI
Feedback Modes 2-0, 3-0, 1-2, 2-2 and 3-1

| Feedback Mode | Feedback Contents |
|---|---|
| Mode 2-0 | UE selects subband feedback, UE selects M subbands, reports the CQI of the M subbands of the first flow, and reports the wideband CQI of the first flow. For the transmission mode 3 and the transmission mode 8, the CQI is calculated according to the reported RI, and for other modes, the rank equals to 1. |
| Mode 3-0 | High level configured wideband CQI (which is sent only on the subband set), and the CQI of each subband (which is sent only on the subband), all corresponding to the first flow (only the transmission mode 3 and the transmission mode 8, different modes are adopted according to different ranks) |
| Mode 1-2 | Full bandwidth (hereinafter referred to as wideband) feedback: optimum PMI (pre-coding information) of each subband, the Wideband CQI of each flow (each subband adopts the feedback PMI each subband adopted), and only the transmission mode 4 and the transmission mode 9, different modes are adopted |
| Mode 2-2 | UE selects subband feedback, and reports the CQI of M subbands (using one PMI), the PMI of the M subbands, wideband CQI and wideband PMI (only in the transmission mode 4 and the transmission mode 9, different modes are adopted according to the different ranks) |
| Mode 3-1 | High level configured subband feedback, wideband PMI, subband CQI of each flow (using wideband PMI), wideband CQI of each flow (using wideband PMI). For the transmission mode 4 and the transmission mode 9, the corresponding PMI and CQI are calculated according to the RI, and for other modes, the rank equals to 1. |

After the above-mentioned pre-appointment is completed, the network side indicates the mobile terminal to access to the transmission mode to be adopted by the user (the transmission mode 8 for instance) via a high level signaling; after receiving the indication, the mobile terminal, according to the actual condition, adopts the aperiodic CQI feedback mode 2-0 or 3-0 corresponding to the transmission mode 8 in the present embodiment to feed back the CQI information to the network side; and the network side, according to the information, configures the MCS (modulation coding scheme) or multi-antenna weighted information sent through the downlink, and send the service data.

Alternatively, the network side indicates the mobile terminal to access to the transmission mode to be adopted by the user (the transmission mode 9 for instance) via a high level signaling; after receiving the indication, the mobile terminal, according to the actual condition, adopts the aperiodic CQI feedback mode 1-2, 2-2 or 3-1 corresponding to the transmission mode 9 in the present embodiment to feed back the RI information, the CQI information of the two flows and the PMI information to the network side; and the network side, according to the information, configures the MCS (modulation coding scheme) or multi-antenna weighted information sent through the downlink, and send the service data.

The Fourth Embodiment

An aperiodic CQI feedback method supporting the forming of dual flow beam is applicable to LTE release 9.0 system and LTE advanced system. The concrete implementation is as follows.

According to the difference between the uplink channel and the downlink channel, the forming of dual flow beam can support the obtaining of the information of the multi-antenna weighted values which depends on the reciprocity of the uplink channel and the feedback of the PMI (pre-coding information) according to the mobile terminal. In the forming of multi-flow beam in which the mobile terminal feeds hack the PMI, since it is needed to feed back the CQI and the PMI of multiple flows, the feedback contents are the same as the contents included in the closed loop multiplexing feedback mode. In order to reduce the definition of the transmission mode, in the present embodiment, the forming of multi-flow beam in which the the mobile terminal feeds back PMI is combined into the transmission mode 4, that is to say, the contents of the transmission mode 4 are modified in the LTE physical layer criteria.

A new transmission mode 4 is pre-appointed as the transmission mode which supports the closed loop multiplexing and the forming of dual flow beam in which the mobile terminal feeds back the PMI.

Meanwhile, the transmission mode 8 is pre-appointed, which supports the forming of the dual flow beam and does not need the pre-coding information feedback.

The aperiodic CQI feedback modes 1-2, 2-2 and 3-1 corresponding to the newly defined transmission mode 4 are appointed.

The aperiodic CQI feedback modes 2-0 and 3-0 corresponding to the transmission mode 8 in the present embodiment are appointed.

In the above, the aperiodic CQI feedback modes 2-0, 3-0, 1-2, 2-2 and 3-1 at least comprise the RI information and the CQI information of the two flows.

The existing CQI feedback modes 2-0 and 3-0 do not support the multi-flow feedback of the transmission mode 8 in the present embodiment. As a result, the aperiodic CQI feedback modes 2-0 and 3-0 in the present embodiment are achieved by feeding back the CQI information of the first flow on the basis of the existing aperiodic CQI feedback modes 2-0 and 3-0. Particularly, the feedback contents of the aperiodic CQI feedback modes 2-0 and 3-0 in the present embodiment are shown in Table 5.

Similarly, the existing CQI feedback modes 1-2, 2-2 and 3-1 do not support the multi-flow feedback of the transmission mode 4 in the present embodiment. As a result, in the present embodiment, the CQI information of multiple flows is fed back according to the different RI values on the basis of the existing aperiodic CQI feedback modes 1-2, 2-2 and 3-1. Particularly, the feedback contents of the aperiodic CQI feedback modes 1-2, 2-2 and 3-1 in the present embodiment are shown in Table 5.

TABLE 5

Feedback Contents of Aperiodic CQI Feedback Modes 2-0, 3-0. 1-2, 2-2 and 3-1

| Feedback Mode | Feedback Contents |
|---|---|
| Mode 2-0 | UE selects subband feedback; UE selects M subbands, reports the CQI of the M subbands of the first flow, and reports the wideband CQI of the first flow. For the transmission mode 3 and the transmission mode 8, the CQI is calculated according to the reported RI, and for other modes, the rank equals to 1. |
| Mode 3-0 | High level configured wideband CQI (which is sent only on the subband set), and the CQI of each subband (which is sent only on the subband), all corresponding to the first flow (only in the transmission mode 3 and the transmission mode 8, different modes are adopted according to different ranks) |
| Mode 1-2 | Full bandwidth (hereinafter referred to as wideband) feedback: optimum PMI (pre-coding information) of each subband, the Wideband CQI of each flow (each subband adopts the feedback PMI), and only the in transmission mode 4, different modes are adopted according to the different ranks. |
| Mode 2-2 | UE selects subband feedback, and reports the CQI of M subbands (using one PMI), the PMI of the M subbands, wideband CQI and wideband PMI (only in the transmission mode 4, different modes are adopted according to the different ranks) |
| Mode 3-1 | High level configured subband feedback, wideband PMI, subband CQI of each flow (using wideband PMI), wideband CQI of each flow (using wideband PMI). For the transmission mode 4, the corresponding PMI and CQI are calculated according to the RI, and for other modes, the rank equals to 1 |

After the above-mentioned pre-appointment is completed, when the network side indicates the mobile terminal to adopt the transmission mode 4 in the present embodiment, the mobile terminals, after receiving the indication, adopts the aperiodic CQI feedback modes 1-2, 2-2 or 3-1 corresponding to the transmission mode 4 in the embodiment to feed back the CQI information, rank RI information and the PMI of each flow to the network side.

When the network side indicates the mobile terminal to adopt the transmission mode 8 in the present embodiment, the mobile terminals adopts after receiving the indication the aperiodic CQI feedback mode 2-0 or 3-0 corresponding to the transmission mode 8 in the present embodiment to feed back the CQI information of the first flow to the network side.

The Fifth Embodiment

An aperiodic CQI feedback method supporting the forming of dual flow beam is applicable to LTE release 9.0 system and LTE advanced system. The concrete implementation is as follows.

For the situation that the forming of the dual flow beam can support the obtaining of the information of the multi-antenna weighted values depending on the reciprocity of the uplink channel, in order to reduce the definition of the transmission mode, the forming of multi-flow beam which does not need the mobile terminal to feed back the PMI is combined into the transmission mode 3 in the present embodiment, that is to say, the contents of the transmission mode 3 is modified in the LTE physical layer criteria.

For the situation that the forming of the dual flow beam needs the mobile terminal to feed back the PMI, in order to reduce the definition of the transmission mode, in the present embodiment, the forming of multi-flow beam which needs the mobile terminal to feed back the PMI can be combined into the transmission mode 4, that is to say, the contents of the transmission mode 4 are modified in the LTE physical layer criteria.

A new transmission mode 3 is pre-appointed as the transmission mode which supports the open loop multiplexing and the forming of dual flow beam which does not need the PMI feedback.

A new transmission mode 4 is pre-appointed as the transmission mode which supports the closed loop multiplexing and the forming of dual beam which needs the PMI feedback.

The aperiodic CQI feedback modes 2-0 and 3-0 corresponding to the transmission mode 3 in the present embodiment are appointed.

The aperiodic CQI feedback modes 1-2, 2-2 and 3-1 corresponding to the transmission mode 4 in the present embodiment are appointed.

In the above, the aperiodic CQI feedback modes 2-0, 3-0, 1-2, 2-2 and 3-1 at least comprise the CQI information.

The existing CQI feedback modes 2-0 and 3-0 do not support the multi-flow feedback of the transmission mode 3 in the present embodiment. As a result, the aperiodic CQI feedback modes 2-0 and 3-0 in the present embodiment are obtained by feeding back the CQI information of the first flow on the basis of the existing aperiodic CQI feedback modes 2-0 and 3-0.

Similarly, the existing aperiodic CQI feedback modes 1-2, 2-2 and 3-1 do not support the multi-flow feedback of the transmission mode 4 in the present embodiment. As a result, in the embodiment the CQI information of multiple flows is fed back according to the different RI values on the basis of the existing aperiodic CQI feedback modes 1-2, 2-2 and 3-1.

The aperiodic CQI feedback modes corresponding to the transmission mode 3 and the transmission mode 4 in the embodiment all report. RI, and therefore the feedback modes also support the handover of the forming of the single flow beam and the forming of the dual flow beam.

After the above-mentioned pre-appointment is completed, when the network side indicates the mobile terminal to adopt the transmission mode 3 in the present embodiment, after receiving the indication the mobile terminals adopts the aperiodic CQI feedback mode 2-0 or 3-0 corresponding to the transmission mode 3 in the present embodiment to feed back the CQI information and the rank RI information of each flow to the network side.

When the network side indicates the mobile terminal to adopt the transmission mode 4 in the present embodiment, after receiving the indication, the mobile terminals adopts the aperiodic CQI feedback mode 1-2, 2-2 or 3-1 corresponding to the transmission mode 4 in the embodiment to feed back the CQI information, the rank RI information and the PMI of each flow to the network side.

The Sixth Embodiment

An aperiodic CQI feedback method supporting the forming of dual flow beam is applicable to LTE release 9.0 system and LTE advanced system. The concrete implementation is as follows.

For the situation that the forming of the dual flow beam can support the obtaining of the information of the multi-antenna weighted values depending on the reciprocity of the uplink channel, in order to reduce the definition of the transmission mode, the forming of multi-flow beam which does not need the mobile terminal to feed back the PMI can be combined into the transmission mode 3 in the present embodiment, that is to say, the contents of the transmission mode 3 can be modified in the LTE physical layer criteria.

In addition, the forming of dual flow beam which does not feed back the PMI is specially defined as a new transmission mode 8.

A new transmission mode 3 is pre-appointed as the transmission mode which supports the open loop multiplexing and the forming of dual beam which does not need the PMI feedback.

The transmission mode 8 is pre-appointed as the transmission mode which supports the forming of dual beam which needs the PMI feedback.

The aperiodic CQI feedback modes 2-0 and 3-0 corresponding to the newly defined transmission mode 3 are appointed.

The aperiodic CQI feedback modes 1-2, 2-2 and 3-1 corresponding to the transmission mode 8 in the present embodiment are appointed.

In the above, the aperiodic CQI feedback modes 2-0, 3-0, 1-2, 2-2 and 3-1 at least comprise the RI information and the CQI information of the two flows.

The existing CQI feedback modes 2-0 and 3-0 do not support the multi-flow feedback of the transmission mode 3 in the present embodiment. As a result, the aperiodic CQI feedback modes 2-0 and 3-0 in the present embodiment can be obtained by feeding back the CQI information of multiple flows according to the different RI values on the basis of the existing aperiodic CQI feedback modes 2-0 and 3-0.

Similarly, the existing aperiodic CQI feedback modes 1-2, 2-2 and 3-1 do not support the multi-flow feedback of the transmission mode 8 in the present embodiment. As a result, in the embodiment the CQI information of multiple flows is fed back according to the different RI values on the basis of the existing aperiodic CQI feedback modes 1-2, 2-2 and 3-1.

After the above-mentioned pre-appointment is completed, when the network side indicates the mobile terminal to adopt the transmission mode 3 in the present embodiment, after receiving the indication, the mobile terminals adopts the aperiodic CQI feedback mode 2-0 or 3-0 corresponding to the transmission mode 3 in the present embodiment to feed back the CQI information and the rank RI information of each flow to the network side.

When the network side indicates the mobile terminal to adopt the transmission mode 8 in the present embodiment, after receiving the indication, the mobile terminals adopts the aperiodic CQI feedback mode 1-2, 2-2 or 3-1 corresponding to the transmission mode 8 in the present embodiment to feed back the CQI information, the rank RI information and the PMI of each flow to the network side.

The Seventh Embodiment

A mobile terminal which supports sending the aperiodic channel quality information is provided in the embodiment. The mobile terminal and the network side pre-appoint one or more transmission modes which support the forming of dual flow beam, and an aperiodic channel quality information CQI feedback mode corresponding to the transmission mode; and after receiving from the network side an indication of adopting one pre-appointed transmission mode, the CQI information is fed back to the network side by adopting the aperiodic CQI feedback mode corresponding to the one pre-appointed transmission mode.

The mobile terminal of the present invention also adopts an aperiodic CQI feedback mode corresponding to the one pre-appointed transmission mode to feed back the pre-coding information PMI to the network side.

The mobile terminal of the present invention adopts the aperiodic CQI feedback mode corresponding to the one pre-appointed transmission mode to feed back the PMI to the network side, when determining the network side can not obtain the multi-antenna weighted value information through the uplink channel.

It can be seen from the above embodiments that the present invention provides the CQI information of the two flows, and therefore can support the feedback requirements of the forming of dual flow beam. In addition, the present invention proposes that the feedback mode of the forming of the dual flow beam can be embodied as the existing CQI feedback mode in the LTE, and therefore the new feedback format does not need to be added, which is in favor of reducing signaling overhead. The feedback contents provided by the present invention comprise the rank feedback. When the rank equals to 1, a singlel flow is adopted: and when the rank equals to 2, the dual flow is adopted, so that the handover from the forming of signal flow beam to the forming of dual flow beam can be supported, even the handover of multi-flow. The present invention provides the CQI feedback mode without PMI feedback information, and as a result, the present invention can support the forming of the multi-flow beam which does not feed back the PMI, which is in favor of reducing feedback overhead. The present invention also provides the CQI feedback mode with PMI feedback information, and as a result, the present invention can support the forming of the multi-flow beam which feeds back the PMI, which is in favor of increasing the feedback dimensionality of the channel information, and improving the throughput of the system.

The descriptions above are only for preferable embodiments of the present invention, which are not used to restrict the present invention. For those skilled in the art, the present invention may have various alterations and changes. Any modifications, equivalent substitutions, and improvements etc. within the spirit and principle of the present invention are all included in the protection scope of the present invention.

INDUSTRIAL APPLICABILITY BRIEF

Compared with the prior art, the present invention can support the feedback requirements of the forming of dual flow beam, and the new feedback format does not need to be added, which is in favor of reducing signaling overhead. The present invention can support the handover from the forming of the single flow beam to the forming of dual-flow beam, even the handover of multiple flows. The present invention can support the forming of multi-flow beam which does not feed back the PMI, which is in favor of reducing feedback overhead. The present invention also can support the forming of multi-flow beam which feeds back the PMI, which is in favor of increasing the feedback dimensionality of the channel information, and improving the throughput of the system.

The invention claimed is:
1. An aperiodic channel quality information sending method comprises:
   a mobile terminal pre-appointing one or more transmission modes which support the forming of dual flow beam and aperiodic channel quality information CQI feedback mode corresponding to the transmission modes with a network side;
   the mobile terminal receiving an indication of adopting the one pre-appointed transmission mode from the network side, and adopting the aperiodic CQI feedback mode corresponding to the one pre-appointed transmission mode to feed back the CQI information to the network side;
   wherein the step of the mobile terminal and the network side pre-appointing one or more transmission modes which support the forming of dual flow beam and aperiodic channel quality information CQI feedback mode corresponding to the transmission modes comprises:
   the mobile terminal and the network side pre-appointing that a transmission mode 8 supports the forming of dual flow beam which needs or does not need the pre-coding information feedback, wherein the aperiodic CQI feedback mode of the transmission mode 8 is the feedback mode 2-0, the feedback mode 3-0, the feedback mode 1-2, the feedback mode 2-2 or the feedback mode 3-1; and
   in the step of feeding back the CQI information to the network side, the mobile terminal also adopts the aperiodic CQI feedback mode corresponding to the one pre-appointed transmission mode to feed back the pre-coding information PMI to the network side when the PMI is needed
   wherein the step of adopting the aperiodic CQI feedback mode corresponding to the one pre-appointed transmission mode to feed back the CQI information to the network side comprises:
   adopting the feedback mode 2-0 or the feedback mode 3-0 to feed back the CQI information of the first flow; or
   adopting the feedback mode 1-2, the feedback mode 2-2 or the feedback mode 3-1 to feed back the CQI information, the rank RI information and the PMI information of each flow.

2. The method according to claim 1, wherein in the step of the mobile terminal adopting the aperiodic CQI feedback mode corresponding to the one pre-appointed transmission mode to feed back the pre-coding information PMI to the network side comprises:
   adopting the aperiodic CQI feedback mode corresponding to the one pre-appointed transmission mode to feed back the PMI to the network side, when the mobile terminal determining that the network side can not obtain the multi-antenna weighted value information via the uplink channel.

3. The method according to claim 1, wherein,
   the step of the mobile terminal and the network side pre-appointing one or more transmission modes which support the forming of dual flow beam, and aperiodic channel quality information CQI feedback mode corresponding to the transmission modes comprises:
   the mobile terminal and the network side pre-appointing that a transmission mode 8 supports the forming of dual flow beam which does not need the pre-coding information feedback, wherein the aperiodic CQI feedback mode of the transmission mode 8 is the feedback mode 2-0 or the feedback mode 3-0;
   the step of adopting the aperiodic CQI feedback mode corresponding to the one pre-appointed transmission mode to feed back the CQI information to the network side comprises:
   adopting the feedback mode 2-0 or the feedback mode 3-0 to feed back the CQI information of the first flow.

4. The method according to claim 1, wherein
the step of the mobile terminal and the network side pre-appointing one or more transmission modes which support the forming of dual flow beam, and aperiodic channel quality information CQI feedback mode corresponding to the transmission modes comprises:
the mobile terminal and the network side pre-appointing that a transmission mode 8 supports the forming of dual flow beam which does not need the pre-coding information feedback, and a transmission mode 9 supports the forming of dual flow beam which needs the pre-coding information feedback,
wherein the aperiodic CQI feedback mode of the transmission mode 8 is the feedback mode 2-2 or the feedback mode 3-0, and the aperiodic CQI feedback mode of the transmission 9 is the feedback mode 1-2, the feedback mode 2-2 or the feedback mode 3-1;
the step of adopting the aperiodic CQI feedback mode corresponding to the one pre-appointed transmission mode to feed back the CQI information to the network side comprises:
adopting the feedback mode 2-0 or the feedback mode 3-0 to feed back the CQI information of the first flow; or
adopting the feedback mode 1-2, the feedback mode 2-2 or the feedback mode 3-1 to feed back the CQI information, the rank RI information and the PMI of each flow.

5. The method according to claim 1, wherein
the step of the mobile terminal and the network side pre-appointing one or more transmission modes which support the forming of dual flow beam, and aperiodic channel quality information CQI feedback mode corresponding to the transmission modes comprises:
the mobile terminal and the network side pre-appointing that a transmission mode 8 supports the forming of dual flow beam which needs the pre-coding information feedback, and a transmission mode 9 supports the forming of dual flow beam which does not need the pre-coding information feedback,
wherein the aperiodic CQI feedback mode of the transmission mode 8 is the feedback mode 1-2, the feedback mode 2-2, or the feedback mode 3-1, and the aperiodic CQI feedback mode of the transmission 9 is the feedback mode 2-0, or the feedback mode 3-0;
the step of adopting the aperiodic CQI feedback mode corresponding to the one pre-appointed transmission mode to feed back the CQI information to the network side comprises:
adopting the feedback mode 1-2, the feedback mode 2-2 or the feedback mode 3-1 to feed back the CQI information, the rank RI information and the PMI information of each flow; or
adopting the feedback mode 2-0 or the feedback mode 3-0 to feed back the CQI information of the first flow.

6. The method according to claim 1, wherein
the step of the mobile terminal and the network side pre-appointing one or more transmission modes which support the forming of dual flow beam, and aperiodic channel quality information CQI feedback mode corresponding to the transmission modes comprises:
the mobile terminal and the network side pre-appointing that a transmission mode 4 supports the forming of dual flow beam which needs the pre-coding information feedback and the closed loop multiplexing, and a transmission mode 8 supports the forming of dual flow beam which does not need the pre-coding information feedback,
wherein the aperiodic CQI feedback mode of the transmission mode 4 is the feedback mode 1-2, the feedback mode 2-2 or the feedback mode 3-1, and the aperiodic CQI feedback mode of the transmission mode 8 is the feedback mode 2-0 or the feedback mode 3-0;
the step of adopting the aperiodic CQI feedback mode corresponding to the one pre-appointed transmission mode to feed back the CQI information to the network side comprises:
adopting the feedback mode 1-2, the feedback mode 2-2 or the feedback mode 3-1 to feed back the CQI information, the rank RI information and the PMI of each flow; or
adopting the feedback mode 2-0 or the feedback mode 3-0 to feed back the CQI information of the first flow.

7. The method according to claim 1, wherein
the step of the mobile terminal and the network side pre-appointing one or more transmission modes which support the forming of dual flow beam, and aperiodic channel quality information CQI feedback mode corresponding to the transmission modes comprises:
the mobile terminal and the network side pre-appointing that a transmission mode 3 supports the forming of dual flow beam which needs no PMI feedback and the open loop multiplexing, and a transmission mode 4 supports the forming of dual flow beam which needs the PMI feedback and the closed loop multiplexing,
wherein the aperiodic CQI feedback mode of the transmission mode 3 is the feedback mode 2-0 or the feedback mode 3-0, and the aperiodic CQI feedback mode of the transmission mode 4 is the feedback mode 1-2, the feedback mode 2-2 or the feedback mode 3-1;
the step of adopting the aperiodic CQI feedback mode corresponding to the one pre-appointed transmission mode to feed back the CQI information to the network side comprises:
adopting the feedback mode 2-0 or the feedback mode 3-0 to feed back the CQI information of the first flow; or
adopting the feedback mode 1-2, the feedback mode 2-2 or the feedback mode 3-1 to feed back the CQI information, the rank RI information and the PMI of each flow.

8. The method according to claim 1, wherein
the step of the mobile terminal and the network side pre-appointing one or more transmission modes which support the forming of dual flow beam, and aperiodic channel quality information CQI feedback mode corresponding to the transmission modes comprises:
the mobile terminal and the network side pre-appointing that a transmission mode 3 supports the forming of dual flow beam which needs no PMI feedback and the open loop multiplexing, and a transmission mode 8 supports the forming of dual flow beam which needs the PMI feedback,
wherein the aperiodic CQI feedback mode of the transmission mode 3 is the feedback mode 2-0 or the feedback mode 3-0, and the aperiodic CQI feedback mode of the transmission mode 8 is the feedback mode 1-2, the feedback mode 2-2 or the feedback mode 3-1;
the step of adopting the aperiodic CQI feedback mode corresponding to the one pre-appointed transmission mode to feed back the CQI information to the network side comprises:
adopting the feedback mode 2-0 or the feedback mode 3-0 to feed back the CQI information of the first flow; or
adopting the feedback mode 1-2, the feedback mode 2-2 or the feedback mode 3-1 to feed back the CQI information, the rank RI information and the PMI of each flow.

9. A mobile terminal which supports sending the aperiodic channel quality information, with the mobile terminal configured to:
  pre-appoint, together with network side, one or more transmission modes which support the forming of dual flow beam, and aperiodic channel quality information CQI feedback mode corresponding to the transmission modes; and
  when receiving from the network side an indication of adopting one pre-appointed transmission mode, adopt the aperiodic CQI feedback mode corresponding to the one pre-appointed transmission mode to feed back the CQI information to the network side, and adopt the aperiodic CQI feedback mode corresponding to the one pre-appointed transmission mode to feed back the pre-coding information PMI to the network side when the PMI is needed;
  wherein, the mobile terminal is configured to pre-appoint, together with network side, one or more transmission modes which support the forming of dual flow beam, and aperiodic channel quality information CQI feedback mode corresponding to the transmission modes comprises:
  the mobile terminal is configured to pre-appoint, with the network side, that a transmission mode 8 supports the forming of dual flow beam which needs or does not need the pre-coding information feedback, wherein the aperiodic CQI feedback mode of the transmission mode 8 is the feedback mode 2-0, the feedback mode 3-0, the feedback mode 1-2, the feedback mode 2-2 or the feedback mode 3-1
  wherein the mobile terminal is configured to adopt the aperiodic CQI feedback mode corresponding to the one pre-appointed transmission mode to feed back the CQI information to the network side comprises:
  the mobile terminal is configured to adopt the feedback mode 2-0 or the feedback mode 3-0 to feed back the CQI information of the first flow; or
  the mobile terminal is configured to adopt the feedback mode 1-2, the feedback mode 2-2 or the feedback mode 3-1 to feed back the CQI information, the rank RI information and the PMI information of each flow.

10. The mobile terminal according to claim 9, wherein the mobile terminal also is configured to adopt the aperiodic CQI feedback mode corresponding to the one pre-appointed transmission mode to feed back the PMI to the network side, when determining the network side cannot obtain the multi-antenna weighted value information via the uplink channel.

* * * * *